US005313215A

United States Patent [19]

Walker et al.

[11] Patent Number: 5,313,215

[45] Date of Patent: May 17, 1994

[54] SATELLITE IDENTIFICATION AND ANTENNA ALIGNMENT

[75] Inventors: Gordon K. Walker, Escondido; John K. Taylor, San Diego, both of Calif.

[73] Assignee: General Instrument Corporation, Chicago, Ill.

[21] Appl. No.: 911,460

[22] Filed: Jul. 10, 1992

[51] Int. Cl.[5] .......... H04B 7/185

[52] U.S. Cl. .......... 342/352; 455/12.1

[58] Field of Search .......... 342/352, 353, 356, 359; 455/12.1, 13.1, 13.2

[56] References Cited

U.S. PATENT DOCUMENTS

| | | | |
|---|---|---|---|
| 4,445,118 | 4/1984 | Taylor et al. | 342/357 |
| 4,743,909 | 5/1988 | Nakamura et al. | 342/359 |
| 4,796,032 | 1/1989 | Sakurai et al. | 342/359 |
| 4,797,677 | 1/1989 | MacDoran et al. | 342/352 |
| 4,888,592 | 12/1989 | Paik et al. | 342/359 |

*Primary Examiner*—Theodore M. Blum
*Attorney, Agent, or Firm*—Edward W. Callan

[57] ABSTRACT

A satellite identification system for identifying a communications satellite from which a broadcast communication signal is being received by an antenna, wherein the communication signal includes data identifying a programmer that broadcast the communication signal and/or an uplink location from which the communication signal is broadcast. The system includes a memory storing a look-up table correlating satellite identification data for a plurality of satellites with the programmer identification data and/or the uplink location data for the plurality of satellites; means for detecting the programmer identification data and/or the uplink location data from a communication signal received by the antenna from one of the plurality of satellites; and means for accessing the look-up table in response to the detected programmer identification data and/or the uplink location data to retrieve the satellite identification data for the satellite from which the communication signal is received. The satellite identification system is included in a satellite antenna alignment system for automatically identifying reference satellites. The satellite antenna alignment system also automatically aligns the antenna to a position at which optimum quality is achieved for a communication signal received from a reference satellite; and the alignment positions of the antenna are measured and stored for at least two reference satellites to which the antenna is automatically aligned. Current correlated data is provided in the look-up tables by detecting updated correlated data in a communication signal received by the antenna and loading the updated correlated data into the look-up tables.

16 Claims, 1 Drawing Sheet

FIG. 1
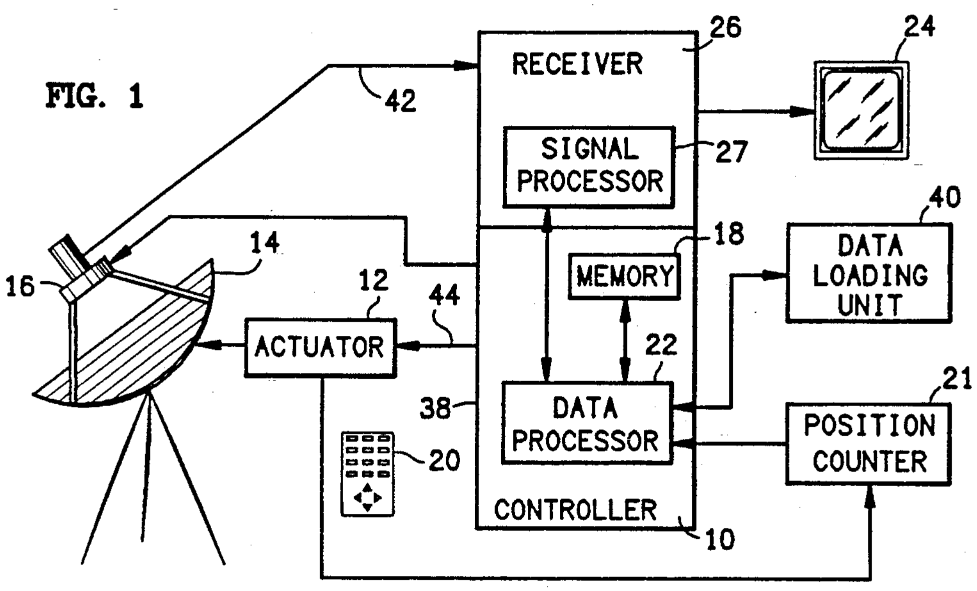
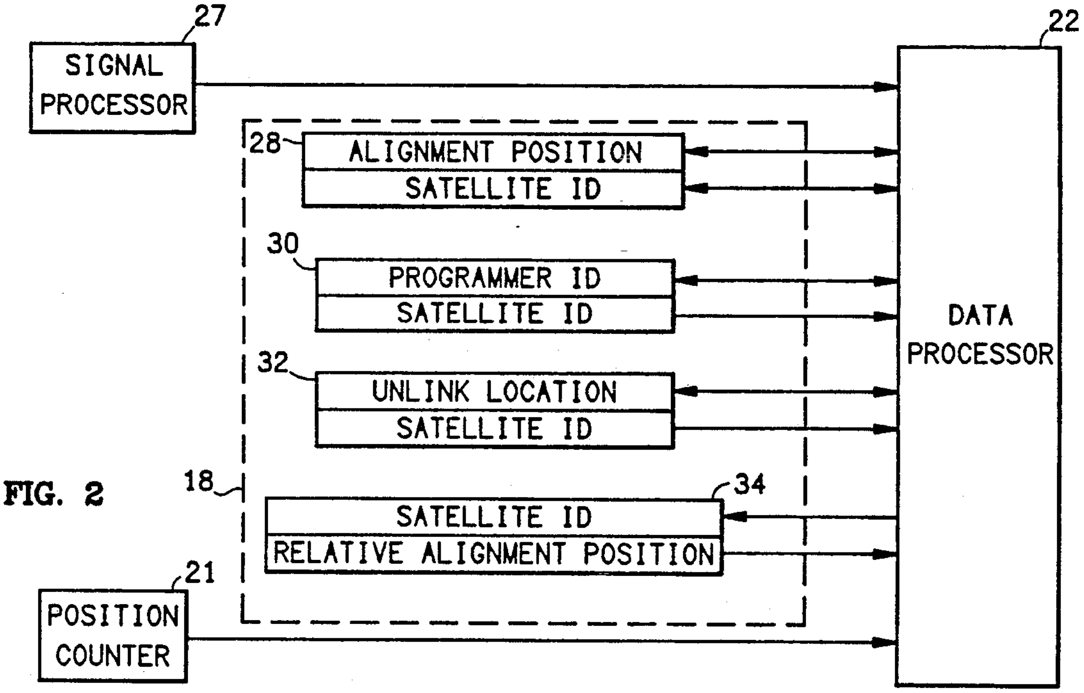
FIG. 2
FIG. 3
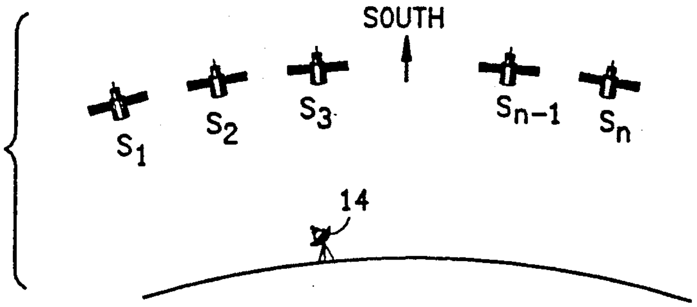

SATELLITE IDENTIFICATION AND ANTENNA ALIGNMENT

BACKGROUND OF THE INVENTION

The present invention generally pertains to alignment of satellite antennas and is particularly directed to a system for identifying a communication satellite from which a broadcast communication signal is being received by an antenna for use in a system for causing an antenna controller for a ground-based satellite antenna to determine the alignment positions of the antenna for a plurality of satellites included in a group of satellites.

A satellite antenna alignment system described in U.S. Pat. No. 4,888,592 to Woo H. Paik, William Fong, Ashok K. George and John E. McCormick includes means for measuring the alignment positions of the antenna for at least two reference satellites included in said group of satellites; and means for processing said measurements with stored data indicating the relative positions of the reference satellites and other satellites included in said group of satellites in accordance with an algorithm to determine the alignment positions of the antenna for the other satellites included in said group.

SUMMARY OF THE INVENTION

The present invention provides a system for identifying a communication satellite from which a broadcast communication signal is being received, which system may be included in a satellite antenna alignment system for improving the speed of operation of the alignment system by automatically identifying the reference satellites.

The satellite identification system of the present invention is a system for identifying a communications satellite from which a broadcast communication signal is being received by an antenna, wherein the communication signal includes data that can be correlated with the identify of the communications satellite, the system comprising a memory storing a look-up table correlating satellite identification data for a plurality of satellites with said signal-included data for said plurality of satellites; means for detecting said signal-included data from a said communication signal received by the antenna from one of said plurality of satellites; and means for accessing the look-up table in response to the detected signal-included data to retrieve said satellite identification data for the satellite from which the communication signal is received.

The satellite antenna alignment system of the present invention is a system for causing an antenna controller for a ground-based communication satellite antenna to automatically determine the alignment positions of the antenna for a group of communication satellites stationed in geosynchronous orbit above the Earth's equator, comprising means for measuring the alignment positions of the antenna for at least two reference satellites included in said group of satellites; means for identifying said at least two reference satellites from which communication signals are being received by the antenna; and means for processing said measurements with stored data indicating the relative positions of the identified reference satellites and other satellites included in said group of satellites in accordance with an algorithm to determine the alignment positions of the antenna for the other satellites included in said group; wherein the communication signal includes data that can be correlated with the identity of the communications satellite; and wherein the satellite identifying means comprise a memory storing a look-up table correlating satellite identification data for said satellites included in said group with said signal-included data for said satellites included in said group; means for detecting said signal-included data in said received communication signal from one of said satellites included in said group when the received communication signal includes said signal-included data; and means for accessing the look-up table in response to the detected signal-included data to retrieve said satellite identification data for the satellite from which the communication signal is received.

The satellite antenna alignment system of the present invention may further include means for automatically aligning the antenna to a position at which optimum quality is achieved for a communication signal received from a reference satellite included in said group of satellites; wherein the means for measuring the alignment positions of the antenna are adapted for making such measurements for at least two said reference satellites to which the antenna is automatically aligned.

Additional features of the present invention are described in relation to the description of the preferred embodiments.

BRIEF DESCRIPTION OF THE DRAWING

FIG. 1 is a block diagram of a preferred embodiment of the antenna alignment system of the present invention.

FIG. 2 is a block diagram of a preferred embodiment of the satellite identification system of the present invention, included in the antenna alignment system of FIG. 1.

FIG. 3 is a diagram illustrating a satellite antenna on Earth and a plurality of satellites in a geostationary orbit.

DESCRIPTION OF THE PREFERRED EMBODIMENT

Referring to FIG. 1, in one preferred embodiment of the present invention, an antenna controller 10 is coupled to an actuator 12 for an antenna 14 and to a mechanical polarizer 16 for the antenna 14. The antenna controller 10 includes a memory 18, a keypad 20, a position counter 21 and a data processor 22. Antenna alignment data is displayed by a television monitor 24 that is coupled to the antenna 14 by a satellite antenna receiver 26. The receiver 26 includes a signal processor 27.

Referring to FIG. 2, the memory 18 includes a plurality of look-up tables, including a look-up table 28 for correlating satellite identification (ID) data for a plurality of satellites and antenna alignment position data for said plurality of satellites; a look-up table 30 correlating programmer ID data for a plurality of satellites and satellite ID data for said plurality of satellites; a look-up table 32 correlating uplink location data for a plurality of satellites and satellite ID data for said plurality of satellites; and a look-up table 34 correlating satellite ID data for a plurality of satellites and relative alignment position data for said plurality of satellites.

Referring again to FIG. 1, the position counter 21 provides measured alignment position data indicating the rotational position of the antenna; and such measured alignment position data is displayed on the monitor 24. The antenna controller 10 and the receiver 26 are housed in a common chassis 38, except that the controller keypad 20 is contained in a remote control unit. This embodiment of the antenna alignment system further includes a data loading unit 40, which may be coupled to the data processor 22 for down loading data into the memory 18, and/or up loading data from the memory 18.

The operation of this embodiment in aligning the antenna 14 with a plurality of satellites $S_1$, $S_2$, $S_3$, $S_{n-1}$ and $S_n$, as shown in FIG. 3, is as follows. Antenna alignment data, including relative antenna alignment positions and polarizer skew data for the plurality of satellites $S_1$, $S_2$, $S_3$, $S_{n-1}$ and $S_n$, is loaded into the look-up table 34 of the controller memory 18, as shown in FIG. 2, either at the time of manufacture of the controller 10 or at the time of installation of the antenna by loading such data with the data loading unit 40. Such antenna alignment data is published and readily available.

Before the alignment positions for a plurality of satellites $S_1$, $S_2$, $S_3$, $S_{n-1}$ and $S_n$ are determined for a newly installed antenna 14, it is first necessary to determine and store in the controller memory 18, the position counts of both the east and west limits of movement of the antenna in order to prevent rotation of the antenna 14 beyond these limits.

Next the alignment positions of the antenna 14 are measured for two reference satellites included among the plurality of satellites $S_1$, $S_2$, $S_3$, $S_{n-1}$ and $S_n$. It is preferable, but not necessary, that the reference satellites be at the extremities of the arc of satellites that are within the east-west range of the antenna 14. Use of extremely positioned satellites as the reference satellites increases the accuracy of the determined positions of the other satellites.

In order to measure the alignment positions of the antenna 14 for a first reference satellite, the controller 10 is operated to move the actuator 12 to rotate the antenna 14 into alignment with the first reference satellite. When alignment is achieved, as determined by either measuring or observing the quality of a television signal on line 42 being received from the first reference satellite, the measured alignment position data provided by the position counter 21 is stored in the look-up table 28, together with the satellite identification data for the first reference satellite.

In an embodiment in which antenna alignment is achieved by observing the quality of the television signal on line 42, the observer observes the quality of the television signal received on line 42 by the receiver 26 and displayed by the monitor 24, and manually adjusts the controller 10 to provide a control signal on line 44 to the actuator 12 to align the antenna 14 to the position at which the television signal observed on the monitor 24 is of optimum quality.

In an embodiment in which antenna alignment is achieved by measuring the quality of the television signal on line 42, the controller 10 measures the quality of the television signal received on line 42 by the receiver 26 and provides a control signal on line 44 to the actuator 12 to automatically align the antenna 14 to the position at which the television signal on line 42 is of optimum quality. A system for automatically aligning the antenna 14 to achieve optimum quality of the received television signal is described in a copending U.S. patent application entitled, "Automatic Adjustment of Receiver Apparatus Based on Channel-Bit-Error-Rate-Related Parameter Measurement", being filed on even date herewith, by Gordon Kent Walker and Paul Moroney. The essential disclosure of said copending application is incorporated herein by reference thereto.

The satellite identification data for the first reference satellite is obtained by the data processor 22 from either the look-up table 30 or the look-up table 32 in response to the respective look-up table, 30, 32 being accessed by either programmer ID data or uplink location data contained in the signal being received by the satellite antenna receiver 26. The programmer ID data or the uplink location data in the received signal for the first reference satellite is detected by the signal processor 27. The same procedure is repeated with respect to a second reference satellite.

Programmer ID data typically is included in a television signal that is broadcast by satellite transmission. A given programmer typically utilizes only a single satellite for such transmissions. The programmer ID data and the satellite ID data are correlated and stored in the look-up table 30.

Uplink location data is included in an ATIS (automatic transmitter identification system) subcarrier signal of FM satellite transmissions pursuant to requirements of the U.S. Federal Trade Commission. A given uplink location directs its signals to only a single satellite. The uplink location data and the satellite ID data are correlated and stored in the look-up table 32.

Because the satellite used by a given programmer and/or the satellite to which a signal is directed from a given uplink location may change from time to time, the correlated programmer ID data and satellite ID data and the correlated uplink location data and satellite ID data that are loaded into the look-up table 30 and the look-up table 32, respectively, must not only be current at the time of installation of the antenna, but also must be updated following installation whenever the satellite is changed. Such updated data preferably is provided by inclusion in a broadcast communication signal that is received by the receiver 26. The updated correlated data is detected by the signal processor 27 and loaded into the look-up tables 30 and 32 through the data processor 22.

Alternatively, correlated data that is current at the time of installation and/or that is updated from time to time may be loaded into the look-up tables 30, 32 by using the data loading unit 40.

The data processor 22 is adapted to process the measured alignment position data of the antenna 14 for the two reference satellites stored in the look-up table 28 and the correlated data indicating the relative alignment positions of the plurality of satellites $S_1$, $S_2$, $S_3$, $S_{n-1}$ and $S_n$, including the two reference satellites, stored in the look-up table 34 in accordance with an algorithm, as expressed in Equation 1, in order to determine the antenna alignment position of the antenna 14 for each of the satellites $S_1$, $S_2$, $S_3$, $S_{n-1}$ and $S_n$ other than the two reference satellites. The algorithm of Equation 1 enables the alignment position P'' of the antenna to be determined for a given satellite $S_i$.

$$P_i'' = P_j' + \{[(P_i - P_j)(P_k' - P_j')] - (P_k - P_j)\} \quad \text{(Eq. 1)}$$

wherein $P_i$ is the relative alignment position of the given satellite $S_i$, $P_j$ is the relative alignment position of the first reference satellite, $P_k$ is the relative alignment position of the second reference satellite, $P_j'$ is the measured alignment position of the first reference satellite, and $P_k'$ is the measured alignment position of the second reference satellite.

Note that $P_i''$ becomes $P_k'$, when $i=k$ and $P_i''$ becomes $P_j'$, when $i=j$, as expected.

The antenna alignment positions for each of the satellites $S_1$, $S_2$, $S_3$, $S_{n-1}$ and $S_n$ that are determined by the processor 22 are stored in the look-up table 28 in order to correlate the determined antenna alignment positions with satellite ID data for the respective satellites $S_1$, $S_2$, $S_3$, $S_{n-1}$ and $S_n$ so that the antenna 14 can be rotated to a position in alignment with any given satellite simply by identifying the satellite to access the stored antenna alignment position in the look-up table 28 associated with the given satellite and causing the controller 10 to move the actuator 12 to rotate the antenna 14 until the measured antenna alignment position corresponds to the stored antenna alignment position.

We claim:

1. A system for identifying a communications satellite from which a broadcast communication signal is being received by an antenna, wherein the communication signal includes data that can be correlated with the identity of the communications satellite, the system comprising a memory storing a look-up table correlating satellite identification data for a plurality of satellites with said signal-included data for said plurality of satellites;

means for detecting said signal-included data from a said communication signal received by the antenna from one of said plurality of satellites; and means for accessing the look-up table in response to the detected signal-included data to retrieve said satellite identification data for the satellite from which the communication signal is received.

2. A system according to claim 1, further comprising means for loading a said look-up table into the memory.

3. A system according to claim 1, further comprising means for detecting data for said look-up table when said data is included in a communication signal received by the antenna; and means for loading the detected said look-up table data into the look-up table.

4. A system according to claim 1, wherein the signal-included data is data identifying a programmer that programmed the broadcast communication signal; and wherein the look-up table correlates said satellite identification data for a plurality of satellites with said programmer identification data for said plurality of satellites.

5. A system according to claim 1, wherein the signal-included data is data identifying an uplink location from which the communication signal is broadcast; and wherein the look-up table correlates said satellite identification data for a plurality of satellites with said uplink location data for said plurality of satellites.

6. A system according to claim 1, wherein the signal-included data in some of said received communication signals includes data identifying the programmer that programmed the broadcast communication signal, and the signal-included data in other of said received communication signals includes data identifying an uplink location from which the communication signal is broadcast;

wherein the memory includes a first said look-up table correlating said satellite identification data for said plurality of satellites with said programmer identification data for said plurality of satellites and a second said look-up table correlating said satellite identification data for said plurality of satellites with said uplink location data for said plurality of satellites;

wherein the detecting means includes means for detecting said programmer identification data from said some communication signals received by the antenna from one of said plurality of satellites, and means for detecting said uplink location data from said other communication signals received by the antenna from one of said plurality of satellites; and wherein the accessing means includes means for accessing the first look-up table in response to the detected programmer identification data to retrieve said satellite identification data for the satellite from which a said communication signal including said programmer identification data is received, and for accessing the second look-up table in response to the detected uplink location data to retrieve said satellite identification data for the satellite from which a said communication signal including said uplink location data is received.

7. A system for causing an antenna controller for a ground-based communication satellite antenna to automatically determine the alignment positions of the antenna for a group of communication satellites stationed in geosynchronous orbit above the Earth's equator, comprising means for measuring the alignment positions of the antenna for at least two reference satellites included in said group of satellites;

means for identifying a said reference satellite from which a communication signal is being received by the antenna; and means for processing said measurements with stored data indicating the relative positions of the identified reference satellites and other satellites included in said group of satellites in accordance with an algorithm to determine the alignment positions of the antenna for the other satellites included in said group;

wherein the communication signal includes data that can be correlated with the identity of the communications satellite; and wherein the satellite identifying means comprise a memory storing a look-up table correlating satellite identification data for said satellites included in said group with said signal-included data for said satellites included in said group;

means for detecting said signal-included data in said received communication signal from one of said satellites included in said group when the received communication signal includes said signal-included data; and means for accessing the look-up table in response to the detected signal-included data to retrieve said satellite identification data for the satellite from which the communication signal is received.

8. A system according to claim 7, further comprising means for loading a said look-up table into the memory.

9. A system according to claim 7, further comprising means for detecting a said look-up table in communication signal received by the antenna; and means for loading the detected said look-up table into the memory.

10. A system according to claim 7, wherein the signal-included data is data identifying a programmer that programmed the broadcast communication signal; and wherein the look-up table correlates said satellite identification data for a plurality of satellites with said programmer identification data for said plurality of satellites.

11. A system according to claim 7, wherein the signal-included data is data identifying an uplink location from which the communication signal is broadcast; and wherein the look-up table correlates said satellite identification data for a plurality of satellites with said uplink location data for said plurality of satellites.

12. A system according to claim 7, wherein the signal-included data in some of said received communication signals includes data identifying the programmer that programmed the broadcast communication signal, and the signal-included data in other of said received communication signals includes data identifying an uplink location from which the communication signal is broadcast;

wherein the memory includes a first said look-up table correlating said satellite identification data for said plurality of satellites with said programmer identification data for said plurality of satellites and a second said look-up table correlating said satellite identification data for said plurality of satellites with said uplink location data for said plurality of satellites;

wherein the detecting means includes means for detecting said programmer identification data from said some communication signals received by the antenna from one of said plurality of satellites, and means for detecting said uplink location data from said other communication signals received by the antenna from one of said plurality of satellites; and wherein the accessing means includes means for accessing the first look-up table in response to the detected programmer identification data to retrieve said satellite identification data for the satellite from which a said communication signal including said programmer identification data is received, and for accessing the second look-up table in response to the detected uplink location data to retrieve said satellite identification data for the satellite from which a said communication signal including said uplink location data is received.

13. A system according to claim 7, further comprising means for automatically aligning the antenna to a position at which a communication signal is received from a reference satellite included in said group of satellites;

wherein the means for measuring the alignment positions of the antenna are adapted for making such measurements for at least two said reference satellites to which the antenna is automatically aligned.

14. A system according to claim 13, wherein the signal-included data is data identifying a programmer that programmed the broadcast broadcast the communication signal; and wherein the look-up table correlates said satellite identification data for a plurality of satellites with said programmer identification data for said plurality of satellites.

15. A system according to claim 13, wherein the signal-included data is data identifying an uplink location from which the communication signal is broadcast; and wherein the look-up table correlates said satellite identification data for a plurality of satellites with said uplink location data for said plurality of satellites.

16. A system according to claim 13, wherein the signal-included data in some of said received communication signals includes data identifying the programmer that programmed the broadcast communication signal, and the signal-included data in other of said received communication signals includes data identifying an uplink location from which the communication signal is broadcast;

wherein the memory includes a first said look-up table correlating said satellite identification data for said plurality of satellites with said programmer identification data for said plurality of satellites and a second said look-up table correlating said satellite identification data for said plurality of satellites with said uplink location data for said plurality of satellites;

wherein the detecting means includes means for detecting said programmer identification data from said some communication signals received by the antenna from one of said plurality of satellites, and means for detecting said uplink location data from said other communication signals received by the antenna from one of said plurality of satellites; and wherein the accessing means includes means for accessing the first look-up table in response to the detected programmer identification data to retrieve said satellite identification data for the satellite from which a said communication signal including said programmer identification data is received, and for accessing the second look-up table in response to the detected uplink location data to retrieve said satellite identification data for the satellite from which a said communication signal including said uplink location data is received.

* * * * *